United States Patent [19]

Stewart

[11] Patent Number: 4,804,253

[45] Date of Patent: Feb. 14, 1989

[54] LENTICULAR FILTER FOR DISPLAY DEVICES

[75] Inventor: Wilber C. Stewart, East Windsor, N.J.

[73] Assignee: General Electric Company, Fairfield, Conn.

[21] Appl. No.: 180,647

[22] Filed: Apr. 6, 1988

Related U.S. Application Data

[63] Continuation-in-part of Ser. No. 863,374, May 15, 1986, abandoned.

[51] Int. Cl.[4] .......................... G02F 1/13; H04N 9/22; G03B 21/60
[52] U.S. Cl. .................................... 350/330; 350/167; 358/251; 313/478
[58] Field of Search ............... 350/330, 339 F, 331 R, 350/167; 313/111, 112, 478; 358/251

[56] References Cited

U.S. PATENT DOCUMENTS

| | | | |
|---|---|---|---|
| 2,728,013 | 9/1952 | Tourshou et al. | 313/92 |
| 2,740,954 | 4/1956 | Kleefeld | 313/478 |
| 2,746,030 | 5/1956 | Schaecongost | 358/251 |
| 3,145,264 | 8/1964 | Schulz | 358/251 |
| 3,781,091 | 12/1973 | Ferguson | 358/251 |
| 3,832,032 | 8/1974 | Shimada | 350/167 |
| 3,851,093 | 11/1974 | Sunstein | 358/251 |
| 3,879,627 | 4/1975 | Robinder | 313/112 |
| 4,126,382 | 11/1978 | Bargilai et al. | 350/339 F |
| 4,184,746 | 1/1980 | Coale | 358/251 |
| 4,310,783 | 1/1982 | Temple et al. | 313/474 |
| 4,472,735 | 9/1984 | Shimozaki et al. | 350/167 |
| 4,509,824 | 4/1985 | Yamasaki et al. | 350/167 |
| 4,621,897 | 11/1986 | Bonnet | 350/167 |
| 4,663,562 | 5/1987 | Miller et al. | 313/478 |

FOREIGN PATENT DOCUMENTS

| | | | |
|---|---|---|---|
| 0155630 | 9/1983 | Japan | 313/478 |
| 0956038 | 4/1964 | United Kingdom | 358/251 |

OTHER PUBLICATIONS

Publication entitled, "Color Television Picture Tubes—Supplement 1", Advances In Image Pickup And Display, by A. M. Morrell, published by Academic Press in 1974, pp. 170-171 from a book entitled Image Pickup and Display.

Primary Examiner—Stanley D. Miller
Assistant Examiner—Tai V. Duong
Attorney, Agent, or Firm—E. M. Whitacre; D. H. Irlbeck; L. L. Hallacher

[57] ABSTRACT

A lenticular filter for a display device includes lenticulations which are angularily disposed with respect to both of the axes of the display and which completely cover the viewing area.

4 Claims, 5 Drawing Sheets

LENTICULAR FILTER FOR DISPLAY DEVICES

This is a continuation-in-part of application Ser. No. 863,374, filed May 15, 1986, now abandoned.

BACKGROUND

This invention relates generally to lenticular filters for displaly devices and particularly to such a filter which filters both the horizontal and vertical lines of such a display device.

The use of lenticular filters to eliminate undesirable lines in display devices is well documented in the prior art. U.S. Pat. No. 2,728,013 shows a lenticular filter being used to eliminate the horizontal scan lines in a kinescope. Also, the use of a lenticular filter to suppress the vertical phosphor line structure of a color television picture tube is described by A. M. Morrell in a publication entitled "Color Television Picture Tubes—Supplement 1—Advances in Image Pickup and Display" published by Academic Press in 1974 and described at pages 170 and 171 of a book entitled "Image Pickup and Display". Thus, the prior art shows the use of lenticular filters to suppress either horizontal lines or vertical lines, depending upon the orientation of the lenticular filter with respect to the display screen. However, some display devices, such as large kinescopes, liquid crystal displays or guided beam flat displays typically have undesirable lines in both the horizontal and vertical directions. For this reason, there is a need for a device for suppressing the undesirable lines in both directions. The present invention fulfills this need.

SUMMARY

A lenticular filter for filtering both horizontal lines and vertical lines in a display device includes a plurality of juxtaposed longitudinal lenticulations angularily disposed with respect to both the horizontal and vertical lines and extending completely across the viewing surface of the display device.

LENTICULAR FILTERS

Figure 1:
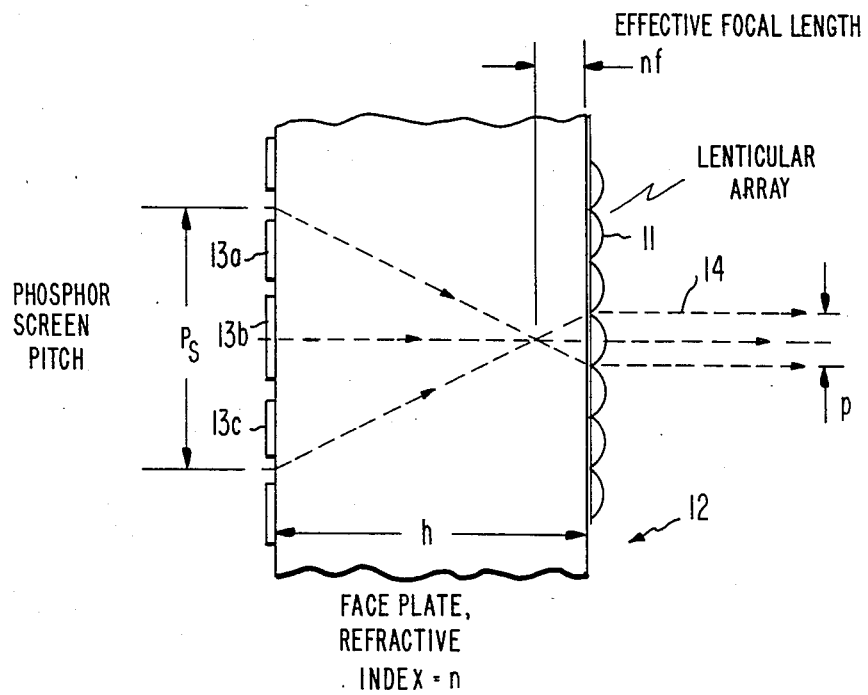
FIG. 1 shows a lenticular filter in combination with phosphor line screen of a display and is useful in understanding the operation of lenticular filters.

In FIG. 1, an array of cylindrical lenslets 11 is shown on the front surface of a faceplate 12 of a picture tube having a phosphor pattern in the form of parallel stripes 13a, 13b, and 13c. The phosphor stripes 13a, 13b and 13c can be replaced with the picture elements of another type of display device, such as the liquid crystal cells of a liquid crystal display, and the filtering action of the lenticular filter remains unchanged. The axes of the cylindrical lenslets 11 are parallel to the phosphor stripes 13a, 13b, and 13c, and are perpendicular to the plane of the drawing. A distant viewer sees bundles of parallel light rays 14 from each of the lenslets 11. The optics are arranged so that the bundle of rays 14 of width p from each lenslet 11 originates from exactly one period $P_s$ of the phosphor screen, or liquid crystal display, and the screen pattern apparent to the viewer is compressed into the much finer pitch of the lens array. This condition is given by the relation:

$$P_s/(h-nf)=p/nf \qquad (1)$$

where:
h is the thickness of the faceplate and lens array;
n is the refractive index of the faceplate and lens material;
f is the focal length (in air) of each of the lenslets.

Picture detail, which is substantially coarser than the period $P_s$, is affected very little by the presence of the lenticular array. In addition, picture detail, and the horizontal scan lines, which are oriented orthogonal to the lenslets 11, are not affected because the cylindrical lenslets have no refractive power in that direction.

Figure 2:
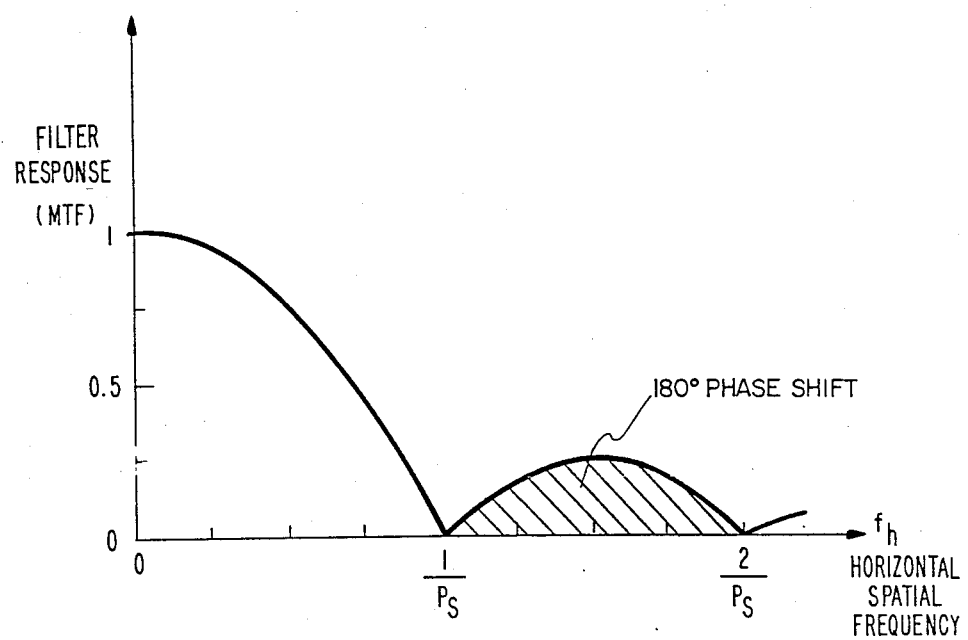
FIG. 2 shows the modulation transfer function versus the spatial frequency of a lenticular filter of the type shown in FIG. 1.
Figure 3:
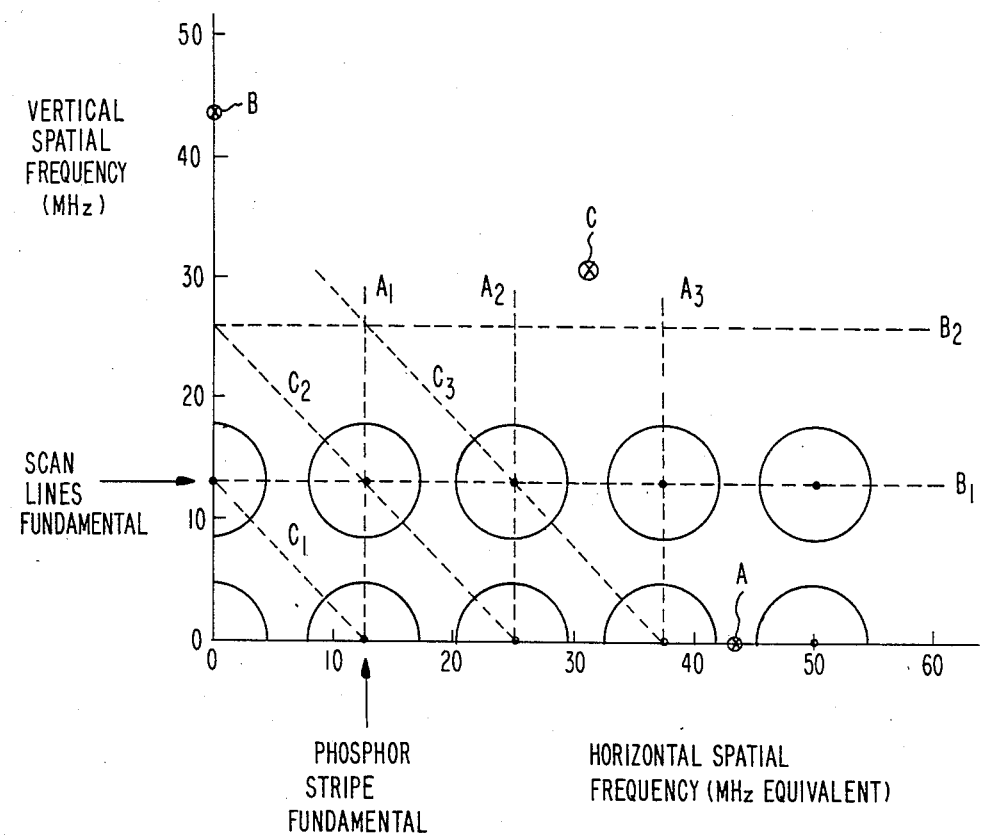
FIG. 3 is a spatial frequency representation of a stationary TV image.

FIG. 2 shows the filter response (also called Modulation Transfer Function, or MTF) as a function of horizontal spatial frequency for a lenticular array which satisfies Equation 1. For coarse spatial frequencies $f_h$ less than 1/p, the response is of the form $$MTF=\sin(\pi P_s f_h)/(\pi P_s F_h), \qquad (2)$$

where $f_h$ is in units of cycles/inch when $P_s$ is measured in inches. The temporal equivalent $g_h$ of the spatial frequency is obtained by multiplying the horizontal spatial frequency by the horizontal line scan velocity. Using the temporal equivalent of the spatial frequency simplfies the comparisons with picture content. In FIG. 2, the lenticular filter has nulls coinciding with the period $P_s$ of the phosphor stripes and all the higher harmonics (up to the spatial frequency $p^{-1}$ of the array). Also, the MTF of the filter drops sharply after the first null. In FIG. 3 the second period is cross sectioned to indicate that adjacent periods are 180° out of phase.

The above discussion shows how the lenticular filter functions to filter the phosphor lines when the lenticulations 11 are parallel to the phosphor lines 13a, 13b, and 13c. The lenticulations can be rotated 90° into parallelism with the horizontal scan lines. Then, by changing the design so that Equation 1 is satisfied when the scan line pitch $P_r$ is substituted for $P_s$, the structure will filter the scan-line pattern of a full TV frame. However, the structure will provide no filtering for the phosphor lines. Thus, the prior art lenticular filters can be used to filter either the vertical phosphor stripes, or the horizontal scan lines.

It is helpful to consider the spatial frequency representation of a stationary TV image as diagrammed in FIG. 3, where any two-dimensional spatial frequency component may be specified by the vertical and horizontal components. The amplitude can be conceptually plotted along a third axis perpendicular to the paper. One simply projects the contour lines of particular amplitude values of interest onto the plane of the diagram. The standard NTSC television signal is bandwidth limited at 4.2 MHz, and the frequencies in the following discussion relating to FIG. 3 are the result of this limitation. Any display, such as a liquid crystal display, which has a different bandwidth limitation will result in different frequencies. However, the theory remains unchanged and the calculation is, therefore, within the skill of the art. In FIG. 3, if the band-limited NTSC picture were not being modulated by the horizontal raster lines and the vertical phosphor stripes, the spatial frequency spectrum would occupy only the region indicated by the quarter circle of radius 4.2 MHz centered at the origin. The scanning lines produce a nearly sinusoidal variation in the vertical direction with negligible higher harmonics. Similarly, the vertical phosphor stripes impose a periodic luminance modulation in the horizontal direction. The first four or five harmonics are significant. These modulation, or sampling effects, produce a multiplicity of spatial sidebands of the picture spectrum about each of the spatial carriers, the spatial carrier harmonics, and about the spatial carrier cross products.

In FIG. 3, a lenticular array for filtering the phosphor stripe periodicity at an equilavent temporal frequency of 12.5 MHz in this example, produces null responses along the dotted vertical contours $A_1, A_2 A_3 \ldots A_n$. The array tends to cancel the higher horizontal frequencies without disturbing the vertical frequencies. An array rotated 90 degrees to cancel the scan line periodicity whose equivalent temporal frequency is taken to be = 12.9 MHz, will produce null responses along the horizontal dotted contours $B_1, B_2, \ldots B_n$. For an intermediate orientation, near 45 degrees for the standard NTSC picture, an array having a first notch occurring at 8.98 MHz gives null responses along the slanted dotted contours $C_1, C_2, D_3, \ldots C_n$. This orientation will simultaneously filter the horizontal scan lines, the vertical phosphor stripes, and the cross-modulation components.

Generally, in order to obtain a null response which intersects the vertical and the horizontal spatial frequency axes at $1/P_r$ and $1/P_s$, respectively, the lenticulations should form an angle $\theta$ with respect to the horizontal direction such that $\tan \theta = P_s/P_r$. The null response in the direction perpendicular to the lenticulations should occur at the spatial frequency $1/P_o$, where $$P_o^2 = P_r^2 + P_s^2. \tag{3}$$

For this more general orientation, the value of $P_o$ from Equation (3) should be substituted for $P_s$ in Equation (1) and in Equation (2). In the preceding example of an angularly oriented lenticular array, the null response occurred at 8.98 MHz. From Equation (2), the maximum attenuation at the NTSC limit of 4.2 MHz is a factor of 0.68, or −3.4 db for picture details which are oriented perpendicular to the lenticulations.

The periodic pattern of lenslets, with a spatial frequency of 1/p, is capable of introducing extra cross-modulation or beat patterns with the periodic structure of the screen. For vertically oriented lenslet grooves, it is possible to choose p to be an exact integral submultiple of the phosphor period $P_s$ that is being filtered. Thus, the spatial frequency of the lenslet structure and its harmonics will coincide exactly with the harmonics of the phosphor stripes, and the resulting beat frequency is zero, there is no periodic variation in brightness due to the beats. The required accuracy, however, is very high in this case. There should be no more than a p/2 accumulated mismatch in the phosphor pattern and the lenticular array over the entire width of the picture. This, typically, corresponds to a tolerance of about 3 parts in 10,000 for the lenslet pitch, which is comparable to the tolerance of the typical screen. Errors in lenslet pitch substantially larger than a p/2 mismatch will produce one or more periods of the Moire beat pattern across the width of the display. Even though the beat pattern has low contrast, the coarseness of its pitch makes it easily perceptible to viewers.

An alternative choice of lenslet pitch which gives much looser tolerances, is to choose p such that $P_s/P = \text{integer} + \frac{1}{2}$. The point marked "A" on the horizontal axis in FIG. 3 represents the lenslet spatial frequency for a ratio of $3 + \frac{1}{2}$. The coarsest beat is given by the distance from "A" to the nearest harmonic of the phosphor (or scan line) pattern, which is 6.25 MHz equivalent for the standard NTSC picture. This is finer than any of the picture detail, but is only falf the pitch of the phosphor stripes, and therefore, possibly would still be visible. Rotating the lenslet array to filter only te scan lines shifts the lenslet spatial frequency to the point "B" on the vertical axis of FIG. 3. Since the higher harmonics of the scan line periodicity are negligible compared with those of the phosphor pattern, no coarse beat patterns are to be expected.

In the intermediate orientation, for which both the vertical phosphor stripes and the horizontal scan lines are filtered, it is preferable for the horizontal component of the lenslet spatial frequency to lie halfway between two adjacent integer harmonics of the phosphor pattern; these harmonics occur at the spatial frequencies $2/P_s$, $3/P_s$, $4/P_s$, and higher. As an example, the lenslet spatial frequency $1/p = (2 + \frac{1}{2})/(P_s \sin \theta)$ is marked by "C" in FIG. 3. This point lies about 7.5 MHz diagonally from two cross-modulation frequencies associated with the very weak second harmonic of the raster lines and the second and third harmonics of the phosphor stripes. The resulting beat pattern will have a finer period and a much lower contrast than does the beat pattern for the filter orientation of point "A". A manufacturing error of 1 percent in lenticle pitch will change the periodicity of the beat pattern for point "C" by about 7 percent; however the pitch of the beat pattern remains quite small, its contrast remains quite low, and thus there is no striking perceptual change in its appearance to the viewer.

In summary, the intermediate orientation provides for simultaneous filtering of the vertical phosphor stripes and the horizontal scan lines. A lenslet spatial frequency, which lies halfway between successive integer harmonics of the phosphor stripe pattern, gives the loosest tolerance on lenslet pitch and greater freedom from visible Moire beat patterns than does a filter which is oriented to eliminate only the phosphor stripe periodicity.

Figure 4:
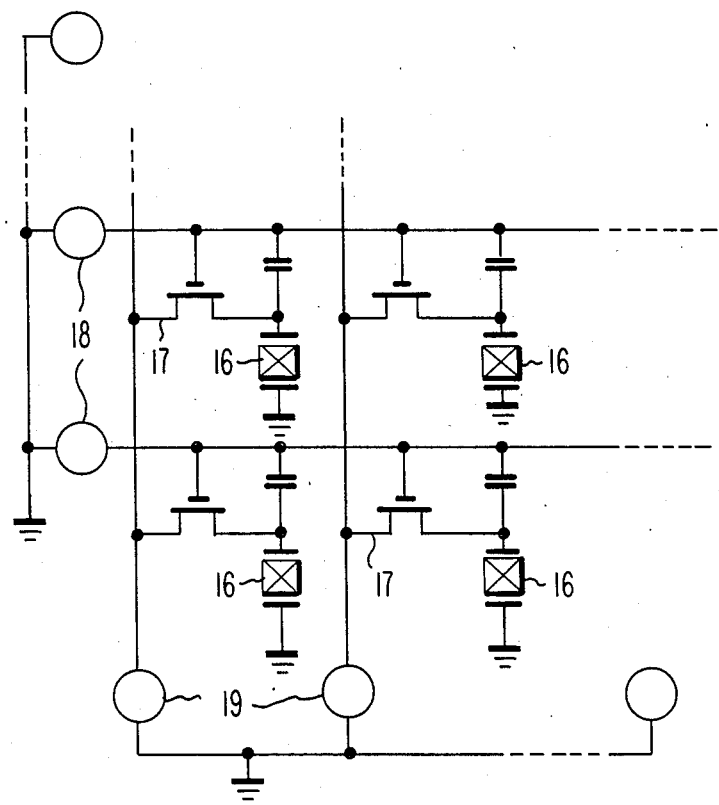
FIG. 4 shows a portion of a prior art liquid crystal display in simplified form.

The above description has been directed to phosphor line displays which are line scanned by electron beams because there are the most common displays in the art. However, the invention is also useful with other types of displays, such as liqiud crystal displays. FIG. 4 shows a small portion of a prior art liquid crystal display. The display is composed of a plurality of liquid crystal cells 16 which are arranged horizontally in rows and vertically in columns. The on/off states of teh crystal cells 16 are controlled by thin film transistors 17. Voltage sources 18 are used to control the horizontal lines and similar voltage sources 19 are used to control the vertical columns. Thus, the display can be controlled by sequentially actuating the voltage sources 18 to effect a vertical scanning of the horizontal rows. The voltage sources 19 for the various crystal cells which are intended to be lit in the energized horizontal row are then turned on and some of the desired crystal cells are illuminated and the others remain off. Thus, the liquid crystal display also has both horizontal and vertical lines. For such a display, equation 1 is satisfied simply by substituting the center-to-center spacing of the crystal cells 16 for the periodicity $P_s$. The angle at which the lenticulations are disposed with respect to the horizontal axis is determined by the physical dimensions of the liquid crystal cells 16.

DETAILED DESCRIPTION

Figure 5:
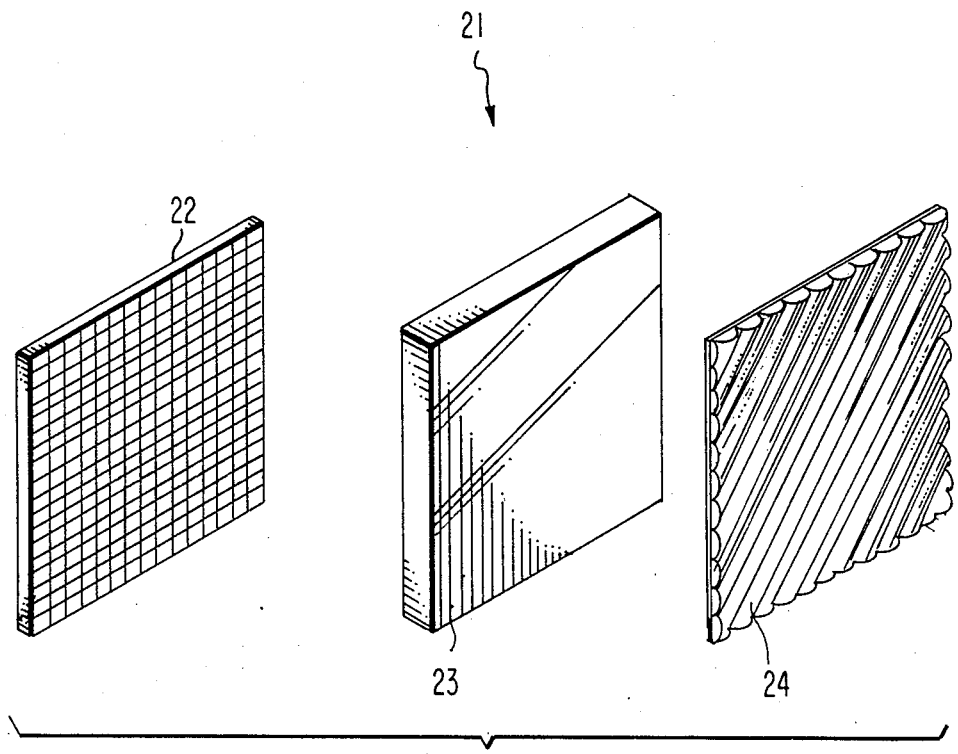
FIG. 5 is a preferred embodiment of a screen faceplate and lenticular filter.

FIG. 5 is a preferred embodiment of a lenticular filter which filters both the horizontal and the vertical lines in a display device. The filter 21 includes a liquid crystal array 22 having a large number of liquid crystal cells arranged horizontally in rows and vertically in columns. A transparent faceplate 23 supports the liquid crystal array 22 on one surface. The other surface of the faceplate panel 23 supports an array of lenticulations 24. The longitudinal axes of the lenticulations are parallel and are angularly disposed with respect to both the vertical and horizontal axis of the liquid crystal array. The angular disposition of the lenticulations with respect to the horizontal axis of the array 21 is determined by the physical dimensions of the liquid crystal cells within the array 22. Thus, for example, if the liquid crystal cells have a square configuration, the angle of the lenticulations will be 45°. When the liquid crystal cells are rectangular, the deviation of the angular disposition from a 45° angle is determined by the horizontal and vertical dimensions of the liquid crystal cells and the calculation is within the purview of those skilled in the art. It should be noted that in FIG. 5 the faceplate 23 and the lenticular array 24 are shown as separate elements. This is for illustration convenience only, in that the faceplate 23 and the lenticular array 24 can be formed as an integral unit.

What is claimed is:

1. A lenticular filter for filtering both horizontal lines having a periodicity of $P_r$ and vertical lines having a periodicity of $P_s$ in a display device having a viewing surface, said lenticular filter comprising:
a plurality of juxtaposed cylindrical lenticulations having a semicircular cross section, and a diameter substantially less than said periodicities, angularly disposed at an angle $\theta$ with respect to said horizontal and vertical lines and extending completely across said viewing surface; where: $\tan \theta = P_s/P_r$, and said lenticulations have a periodicity
$p = P_s \sin\theta/(n+\frac{1}{2})$ where:
$p$ = the periodicity fo said lenticulations,
$P_s$ = periodicity of said vertical lines,
$n$ = an integer.

2. The filter of claim 1 wherein said display is a liquid crystal display.

3. The filter of claim 1 wherein said display is cathode ray tube.

4. The filter of claim 1 wherein said display is a guided beam flat display.

* * * * *

UNITED STATES PATENT AND TRADEMARK OFFICE
CERTIFICATE OF CORRECTION

PATENT NO. : 4,804,253

DATED : February 14, 1989

INVENTOR(S) : William Clarence Stewart

It is certified that error appears in the above-identified patent and that said Letters Patent is hereby corrected as shown below:

Col. 3, line 29 "$D_3$" should be --$C_3$--
Col. 4, line 12 "falf" should be "half"
Col. 4, line 14 delete "te" insert --the--
Col. 6, line 21 delete "fo" insert --of--

Signed and Sealed this

Sixth Day of February, 1990

*Attest:*

JEFFREY M. SAMUELS

*Attesting Officer*     *Acting Commissioner of Patents and Trademarks*